Figure 1:
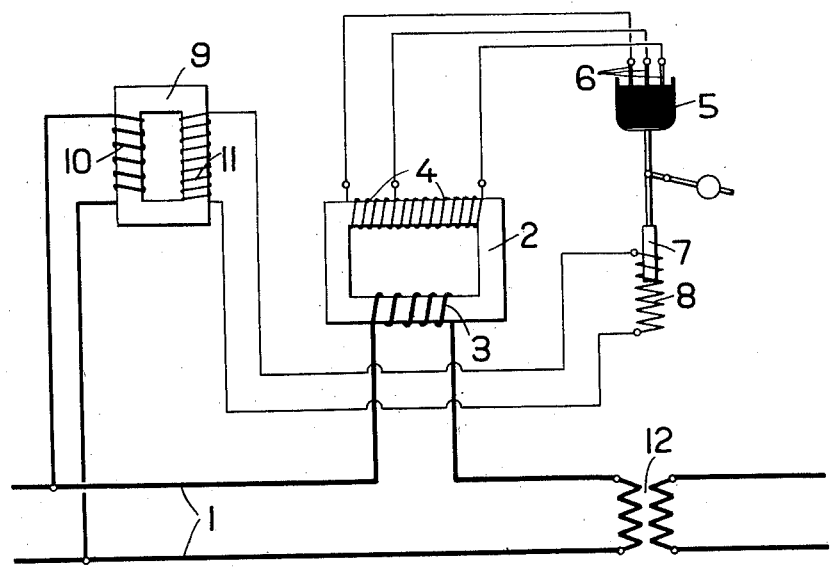

Inventor;
G. J. Van Swaay.
H. I. Keus.

by Albert E. Parker
Attorney

UNITED STATES PATENT OFFICE.

GERARDUS JACOBUS van SWAAY, OF DELFT, AND HENRI ISAÄC KEUS, OF HENGELO, NETHERLANDS.

REGULATION OF THE VOLTAGE OR CURRENT IN ALTERNATING ELECTRIC DISTRIBUTING SYSTEMS.

1,321,342.     Specification of Letters Patent.     Patented Nov. 11, 1919.

Original application filed January 23, 1915, Serial No. 3,869. Divided and this application filed August 15, 1916. Serial No. 115,106.

*To all whom it may concern:*

Be it known that we, GERARDUS JACOBUS VAN SWAAY, residing at Delft, the Netherlands, and HENRI ISAÄC KEUS, residing at Hengelo, the Netherlands, formerly of Delft, the Netherlands, subjects of the Queen of the Netherlands, have invented certain new and useful Improvements in Regulation of the Voltage or Current in Alternating Electric Distributing Systems, of which the following is a specification.

This invention relates to a method of regulating and controlling the voltage or current in an alternating current system.

The object of the invention is to provide a method in which the apparatus connected in or across the load carrying conductors have no contacts moving during the operation and which method is very simple owing to the fact that only alternating current is employed for obtaining the required regulation, so that any other source of current or any apparatus for converting the alternating current are avoided.

The principle of the invention is founded on the well known property that if in an inductance coil the magnetic field is varied the counter-electromotive force induced in this coil varies, with the result that if this inductance coil is included in the mains of an alternating current system, an increase in the magnetic flux of this coil will cause an increased potential being absorbed in the inductance, while a decrease in said magnetic flux will cause a decreased potential being absorbed in the inductance.

According to the invention the variation of the inductance is obtained by setting up alternating magnetizations and superposing same upon the initial magnetizations produced by the current traversing the inductance.

The most suitable inductance to be included within the circuit is a choke-coil, having its magnetizing windings connected in one of the mains of the current system. On this coil we arrange a second set of windings traversed by an alternating current, inducing alternating magnetizations in the core of the choke-coil.

The alternating current may be obtained from a suitable source. We have, however, found that a very effective regulation may be obtained by simply short circuiting a variable number of turns of said secondary windings on the core of the choke-coil. In this case the variable inductance is a transformer with partly or wholly short circuited secondary windings. The method according to our invention may be used for regulating and controlling the voltage or current in various instances which are described hereafter with reference to the accompanying drawings.

Figure 1 diagrammatically shows an arrangement by which the voltage at an arbitrary point in an alternating current distributing net is controlled by means of the fluctuations in voltage in the mains.

Figure 2:
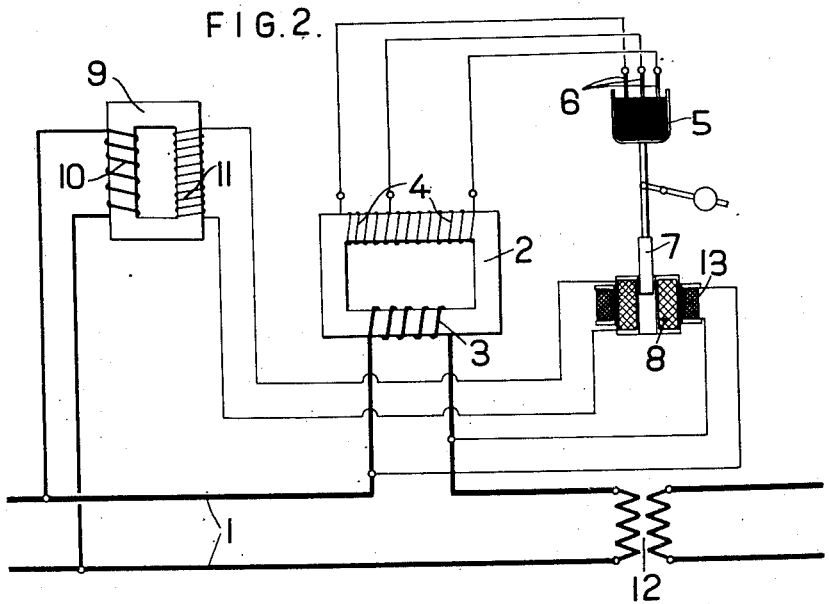

Fig. 2 diagrammatically shows a modified arrangement for regulating the voltage, which is employed if the full load currents are heavy in comparison with the magnetizing currents of the transformer between the input and output main circuit.

Figure 3:
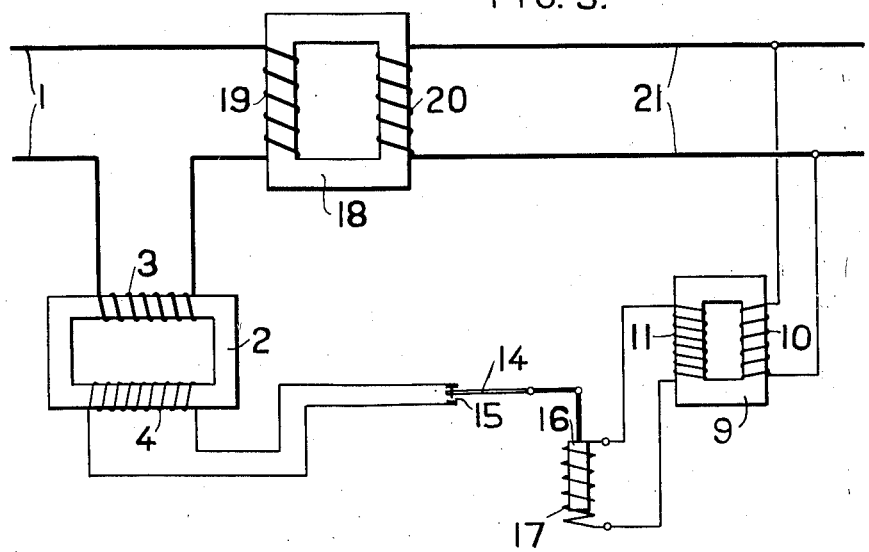

Fig. 3 diagrammatically shows an arrangement for regulating and controlling the voltage in the lighting circuit of a factory with a considerably varying load.

Referring first to Fig. 1 of the drawings the arrangement with which the method of the invention is brought to practice consists principally of a transformer 2 the primary windings 3 of which are included in one of the mains 1 of an alternating electric system. The secondary windings 4 of this transformer are connected to contacts 6 in such a manner that between two contacts a number of turns of said secondary windings are connected. The contacts 6 are immersed in a mercury cup 5 fixed to a core 7 of soft iron laminations in such a manner that reciprocating movements of the core 7 are followed by the mercury cup 5. The core 7 is subjected to the magnetic action of a coil 8 connected to the secondary windings 11 of a second transformer 9. The primary windings 10 of this transformer are connected across the mains 1 of the alternating electric circuit. The operation of this arrangement is as follows:

When the voltage between the mains 1 reaches its maximum value, which will generally be the case at no load when the mains only carry the magnetizing current of the main transformer 12, the primary windings 10 of the transformer 9 will be traversed by the maximum current. As a result the potential induced in the secondary windings 11 will attain a maximum and the coil 8 will be traversed by the maximum current. The core 7 will be drawn farther into this coil with the result that part of the contacts 6 comes out of contact with the mercury in the cup 5, thereby breaking short circuit of a number of turns of the secondary windings 4. In this case the magnetic flux in the transformer 2 induced by the current traversing the primary windings 3 is not counteracted by the windings 4, so that this magnetic flux attains its maximum value when the windings 4 are not short circuited. An increase in the magnetic flux of the transformer 2, however, results in an increase in the inductance of the windings 3, so that at the terminals of the main transformer 12 of the circuit the voltage is reduced. With a load coming on the line the voltage between the mains 1 will drop and consequently the number of ampere turns in the primary windings 10 of the transformer 9 will decrease. The core 7 will be released more or less by its coil 8 owing to the drop in voltage at the terminals of the secondary coil 11 of the transformer 9. As a result part of the contacts 6 will plunge into the mercury and short circuit part of the windings 4 of the transformer 2. By this means the inductance of the primary windings 3 of said transformer is reduced and a smaller voltage of the mains 1 is annulled. The transformer 2 may be so proportioned that at any load on the mains 1 the primary terminal voltage on the transformer 12 remains constant or it may be so proportioned that this voltage is regulated to a suitable extent.

Another embodiment of the invention is shown by way of example in Fig. 2. This arrangement is specially suitable if the full load currents are heavy in comparison with the magnetizing current of the transformer 12 in order to avoid excessive absorption of voltage in winding 3 of the transformer 2. Besides the coil 8 acting on the core 7 a coil 13 is arranged also acting on this core but in opposite direction and connected between the conductors leading to the primary windings 3 of the transformer 2. In case the voltage absorbed in the primary windings 3 of the transformer 2 tends to become excessive, for instance with small loads on the mains 1, the magnetic field induced in the coil 13 will increase with the voltage at the terminals of the primary windings 3. Consequently the action of the coil 8 on the core 7 will be reduced and a number of turns of the windings 4 will be short circuited notwithstanding the action of the coil 8.

An arrangement especially adapted for regulating the voltage in the lighting mains or other sub mains of a factory with widely varying power consumption is illustrated in Fig. 3, wherein the main lines of the system are indicated by 1. These lines are connected to the primary windings 19 of the main transformer 18, the secondary windings 20 of which transformer supply the lighting mains or other sub mains 21 of the factory with current. In this case the primary windings 10 of the transformer 9 are connected across the lighting mains or other sub mains 21 of the factory. The secondary windings 11 of this transformer are connected to a coil 17 provided with a movable core 16, which latter is fixed to one of the arms of a lever 14. The opposite end of the lever 14 is electrically connected to a conductor leading to the secondary windings of the transformer 2 adapted to regulate the voltage between the mains 1 at the terminals of the primary windings 19 of the main transformer 18. The opposite terminal of said secondary windings 4 is connected to a contact 15 arranged in such a manner that an oscillating movement of said lever 14 will periodically close and open the circuit of the windings 4. The lever 14 may be constructed so as to be very sensitive so that any fluctuation in the current traversing the coil 17 will immediately cause an oscillating movement of the lever. By this means the opening and closing of the contact 15 may take place in very rapid succession. In order to make the device 14, 15, 16, 17 respond to the smallest fluctuations in voltage between the mains 21 to be regulated same may be operated by a transformer or other apparatus in which fluctuations in the voltage between the mains 21 are magnified so that the first mentioned fluctuations cause considerably increased actions on the device 14, 15, 16, 17.

As a result of the short circuiting of the secondary windings 4 of the transformer 2, the inductance of the primary windings 3 will fall and consequently the terminal voltage at the primary windings 19 of the main transformer 18 will rise. The rise in voltage between the sub mains 21, due to the rise in voltage at the windings 19 will cause the coil 17 to draw in its core 16 and to open the circuit of the windings 4. This action is repeated. By providing the secondary windings 4 of the transformer 2 with a large number of turns the spark on opening the contact 15 may be made harmless.

As explained above the short circuiting of the secondary windings 4 causes a variation in the inductance in the primary windings 3 so that a variable voltage is annulled by the transformer 2 if the voltage between the mains 21 is varying. It is obvious that, instead of short circuiting the windings 4 on the transformer 2 for regulating the inductance in the coil 3 according to the invention, the secondary windings 4 may be supplied with alternating current from any suitable source. The arrangement shown in the drawings is merely intended to illustrate the most simple arrangement and it is clear that this arrangement in simplicity excels any other arrangement for the purpose known up to the present.

It should further be understood that the transformer 9 and the electro-responsive device for short circuiting the secondary windings 4 are only illustrated by way of example and that these devices may have any other suitable form without departing from the spirit of the invention.

The method of the invention may as well be applied for regulating and controlling the current in an alternating electric circuit. For this purpose it is sufficient to connect the primary windings 10 of the transformer 9 in the current of the mains to be regulated so that the electro-responsive device is operating on fluctuations in the current to be controlled.

Having now described our invention, what we claim as new and desire to secure by Letters Patent is:—

1. The combination with an electrical distribution system, of means for controlling electrical fluctuations in said system, comprising a paramagnetic core, primary windings on said core included within one of the mains of said system, secondary windings on said core, a switching device adapted to short circuit a variable number of turns of said secondary windings, electromagnetic means adapted to actuate said switching device responsive to said electrical fluctuations, and electro-magnetic means connected across the terminals of said primary windings and adapted to counter-act or suppress the influence of said first mentioned electro-magnetic means upon said switching device responsive to the voltage drop in said primary windings substantially as set forth.

2. The combination with an electrical distribution system, of means for controlling electrical fluctuations in said system, comprising a paramagnetic core, primary windings on said core included within one of the mains of said system, secondary windings on said core, a switching device adapted to short circuit a variable number of turns of said secondary windings, and electro-magnetic means energized directly from said distribution system for actuating said switching device in varying degree, according to the electrical fluctuations in said distribution system, substantially as set forth.

3. The combination with an electrical distribution system, of means for controlling electrical fluctuations in said system comprising a paramagnetic core, a primary winding on said core included within one of the mains of said system, secondary windings on said core, a switching device adapted to short circuit a progressively variable number of turns of said secondary windings, and electro-magnetic means adapted to actuate said switching device responsive to said electrical fluctuations, substantially as set forth.

In testimony whereof we have signed our names to this specification.

GERARDUS JACOBUS VAN SWAAY.
HENRI ISAAC KEUS.